United States Patent
Ginsberg (10) Patent No.: US 10,907,847 B2
(45) Date of Patent: Feb. 2, 2021

(54) INTELLIGENT HEATING, VENTILATION, AND AIR CONDITIONING SYSTEM

(71) Applicant: United States of America as Represented by The Secretary of The Army, Alexandria, VA (US)

(72) Inventor: Mark D Ginsberg, Champaign, IL (US)

(73) Assignee: UNITED STATES OF AMERICA AS REPRSENTED BY THE SECRETARY OF THE ARMY, Alexandria, VA (US)

( * ) Notice: Subject to any disclaimer, the term of this patent is extended or adjusted under 35 U.S.C. 154(b) by 0 days.

(21) Appl. No.: 16/147,063

(22) Filed: Sep. 28, 2018

(65) Prior Publication Data

US 2020/0103132 A1    Apr. 2, 2020

(51) Int. Cl.
| | | |
|---|---|---|
| F24F 11/30 | (2018.01) | |
| F24F 3/16 | (2021.01) | |
| F24F 11/62 | (2018.01) | |
| F24F 11/89 | (2018.01) | |
| F24F 13/06 | (2006.01) | |

(Continued)

(52) U.S. Cl.
CPC ............ F24F 11/30 (2018.01); F24F 3/1603 (2013.01); F24F 11/62 (2018.01); F24F 11/79 (2018.01); F24F 11/89 (2018.01); F24F 13/06 (2013.01); F24F 13/28 (2013.01); *F24F 2110/50* (2018.01)

(58) Field of Classification Search
CPC .......... F24F 11/30; F24F 11/89; F24F 3/1603; F24F 13/28; F24F 11/79; F24F 11/62; F24F 13/06; F24F 2110/50
See application file for complete search history.

(56) References Cited

U.S. PATENT DOCUMENTS 5,976,010 A * 11/1999 Reese .................. F24F 11/30
                                                    454/229
2004/0173092 A1 * 9/2004 Moore ............... B01D 46/0036
                                                    95/8

(Continued)

OTHER PUBLICATIONS

Stockie "The Mathematics of Atmospheric Dispersion Modeling" SIAM Review, vol. 53, No. 2, pp. 349-372, 2011 (Year: 2011).*
Paladino et al. "Analytical Solutions of Three-Dimensional Contaminant Transport Models with Exponential Source Decay", Groundwater, vol. 56, Issue 1, Jan./Feb. 2018, First published: Jul. 17, 2017 (Year: 2017).*

(Continued)

*Primary Examiner* — Thomas C Lee
*Assistant Examiner* — Michael Tang
(74) *Attorney, Agent, or Firm* — Brian C. Jones (57) ABSTRACT

Disclosed is an intelligent heating, ventilation, and air conditioning ("HVAC") system. Located within an architectural structure, the HVAC system incorporates an airborne contaminant-flow calculator. When sensors (or a human operator) detect an "incident" (e.g., a contaminant is detected or an unexpected breach occurs in the structure that may be associated with the introduction of a contaminant), the HVAC system recalculates airflows for the structure. If the newly recalculated airflow so warrants, the HVAC system protects the structure's occupants from the airborne contaminant by changing the airflow through the structure (e.g., the HVAC system closes a shutter in the air ducts, turns up a fan, or redirects airflow to a standby filtration system). The HVAC system's calculator uses a closed-form solution for calculating the airflow in order to present its results in a timely fashion.

14 Claims, 7 Drawing Sheets

(51) Int. Cl.
    *F24F 13/28*     (2006.01)
    *F24F 11/79*     (2018.01)
    *F24F 110/50*     (2018.01)

(56) References Cited

U.S. PATENT DOCUMENTS

| | | | | |
|---|---|---|---|---|
| 2012/0253769 | A1* | 10/2012 | Poondru | G06F 17/5009 |
| | | | | 703/9 |
| 2015/0073758 | A1* | 3/2015 | Le Goff | G06F 17/5018 |
| | | | | 703/2 |
| 2015/0369504 | A1* | 12/2015 | Flaherty | F24D 19/1084 |
| | | | | 700/277 |

OTHER PUBLICATIONS

M.D. Ginsberg et al., "Bioprotection of facilities", Defense & Security Analysis, 31:1, 4-21, Feb. 25, 2015 (Year: 2015).*

* cited by examiner

INTELLIGENT HEATING, VENTILATION, AND AIR CONDITIONING SYSTEM

FEDERALLY SPONSORED RESEARCH OR DEVELOPMENT

Under paragraph 1(a) of Executive Order 10096, the conditions under which this invention was made entitle the Government of the United States, as represented by the Secretary of the Army, to an undivided interest therein on any patent granted thereon by the United States. This and related patents are available for licensing to qualified licensees.

CROSS-REFERENCE TO RELATED APPLICATIONS

The present application is related to U.S. patent application Ser. No. 16/146,941 which is incorporated herein in its entirety by reference.

BACKGROUND

Field of the Invention

The present disclosure is related generally to heating, ventilation, and air conditioning systems and, more particularly, to airborne contaminant flows in such systems.

Description of the Related Art

This section introduces aspects that may help facilitate a better understanding of the invention. Accordingly, the statements of this section are to be read in this light and are not to be understood as admissions about what is prior art or what is not prior art.

Generally speaking, a structure's heating, ventilation, and air conditioning ("HVAC") system is primarily responsible for distributing air throughout the structure. Unfortunately, airborne contaminants may be spread along with the air. Some such contaminants may be deliberately introduced by acts of terrorism as the anthrax attacks of 2001 illustrated. Even in peacetime, HVAC systems may spread the chemical or biological contaminants that contribute to "sick building syndrome."

BRIEF SUMMARY

Within an architectural structure, an intelligent HVAC system incorporates an airborne contaminant-flow calculator. When sensors (or a human operator) detect an "incident" (e.g., a contaminant is detected or an unexpected breach occurs in the structure that may be associated with the introduction of a contaminant), the HVAC system recalculates airflows for the structure. If the newly recalculated airflow so warrants, the HVAC system protects the structure's inhabitants from the airborne contaminant by changing the airflow through the structure (e.g., the HVAC system closes a shutter in the air ducts, turns up a fan, or redirects airflow to a standby filtration system). The HVAC system's calculator uses a closed-form solution for calculating the airflow in order to present its results in a timely fashion.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the" are intended to include the plural forms as well, unless the context clearly indicates otherwise. It further will be understood that the terms "comprises," "comprising," "includes," and "including" specify the presence of stated features, steps, or components but do not preclude the presence or addition of one or more other features, steps, or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

Designing (or redesigning) architectural structures to protect their occupants from airborne contaminants is a known priority. Clearly, access to safe air is a life-safety issue, yet it has been difficult to achieve protection from airborne contaminants once those contaminants are drawn into a structure's HVAC system. This difficulty arises from a combinatorial explosion of different technical problems.

One of these problems involves the calculating of exposure levels for the structure's occupants under various scenarios. The problem can be stated in terms of systems of ordinary differential equations which can be addressed by matrix-inversion methods. However, traditional methods for calculating a solution to those systems become slow and unwieldy as the structure increases in both number of rooms and in the number of HVAC zones. Unfortunately for the sake of quick calculations, typical buildings have many HVAC zones and many rooms per zone. Even structures as small as a mobile home require many minutes of computer simulation to analyze the first few minutes of a simulated exposure to biological or chemical contaminants.

Thus, meaningful feedback on exposure was not often provided to the structure's designer. Exposure levels were only calculated for situations where bio-protection was utterly imperative (e.g., military installations and some hospital operating rooms). Even then, the calculations would serve only as a single final check on the structural design and would not contribute much to the design process itself.

Additionally, calculating exposure levels during a real-time response to a contamination incident was unheard of.

The techniques of the present disclosure address these and other issues. By incorporating a near real-time calculator of airborne contaminant flows, a novel intelligent HVAC system responds to contamination incidents quickly and with precision. The intelligent HVAC system, or an operator alerted by the HVAC system, uses the calculations to determine how best to respond to the contamination incident. Because the calculator uses so few computer resources, it can be repeatedly invoked to test and compare various response possibilities.

Figure 1:
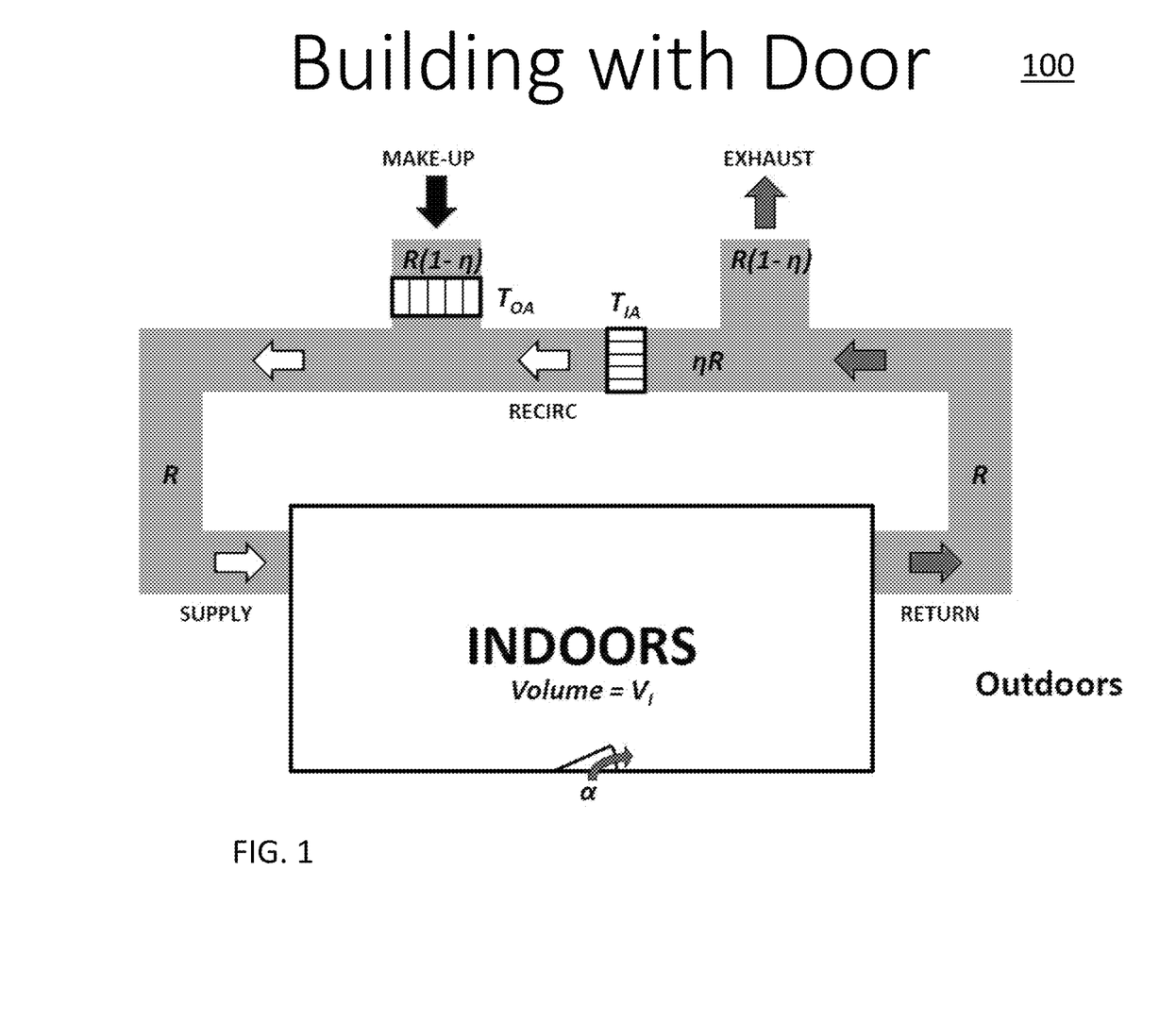
FIG. 1 is a generalized schematic of an HVAC system in which the present techniques may be practiced.

To illustrate aspects of the presently disclosed techniques, FIG. 1 presents a very stylized building 100. Because this building 100 is so simple, the layout of its HVAC system is straightforward. It has two HVAC loops: 102 is the primary loop, and 104 is an "emergency" loop discussed later. The variables in FIG. 1 represent:

R rate of ventilation in the building 100;

η fraction of air recirculated, implies (1−η) is the fraction of "makeup air;"

$T_{OA}$ transmittance of the outdoor air filter at a fixed particle size;

$T_{IA}$ transmittance of the indoor air filter at a fixed particle size;

V volume of the building's interior;

$T_E$ transmittance of the emergency air filter at a fixed particle size; and $R_E$ rate of ventilation of the emergency loop.

(Although the HVAC system shown in FIG. 1 is integrated into a building, it could as well be in another type of architectural structure such as a vehicle (boat, submarine, airplane, spaceship), a space station, or something else.)

Figure 2:
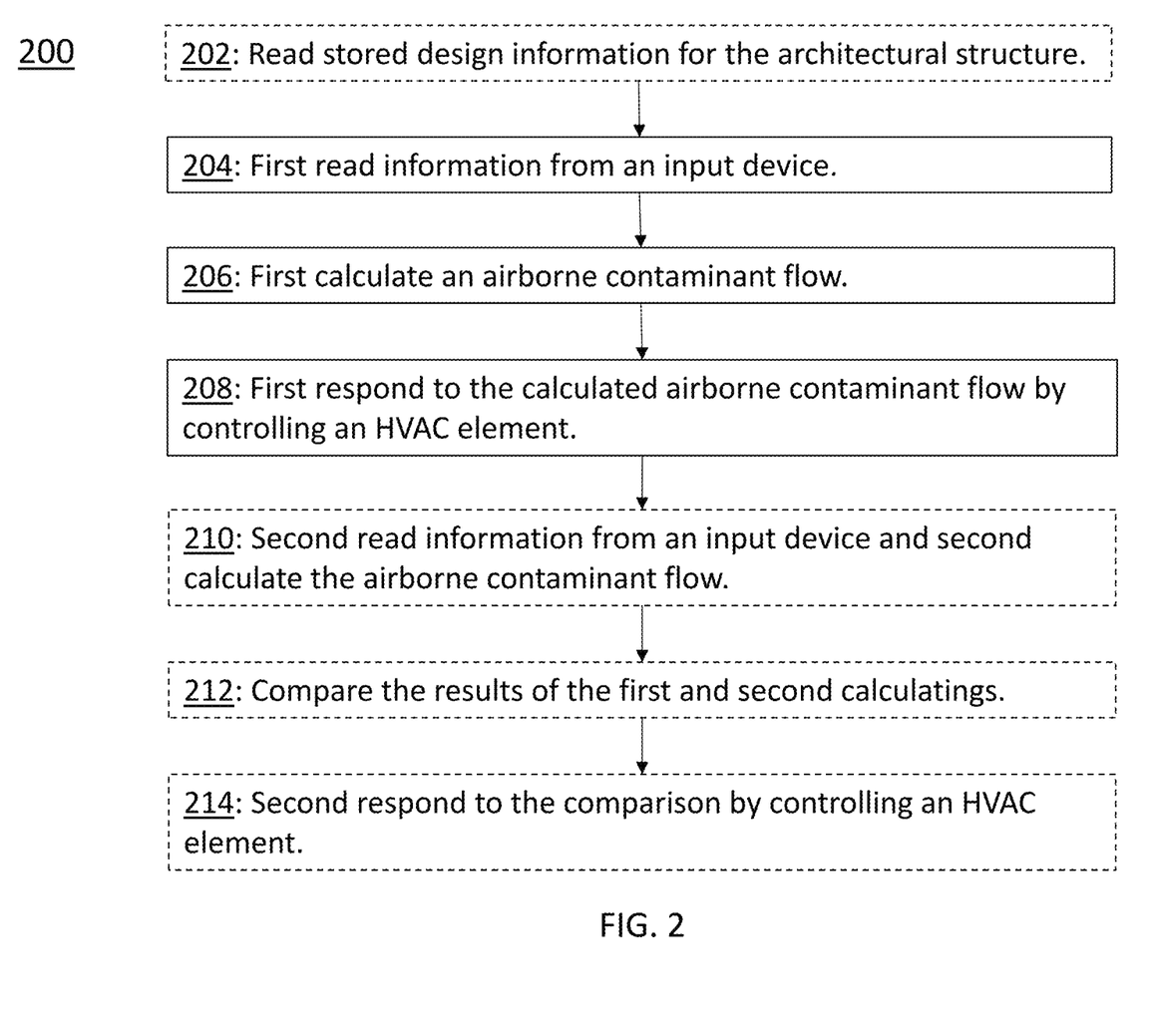
FIG. 2 is a flowchart of a representative method for the operation of an intelligent HVAC system.
Figure 3:
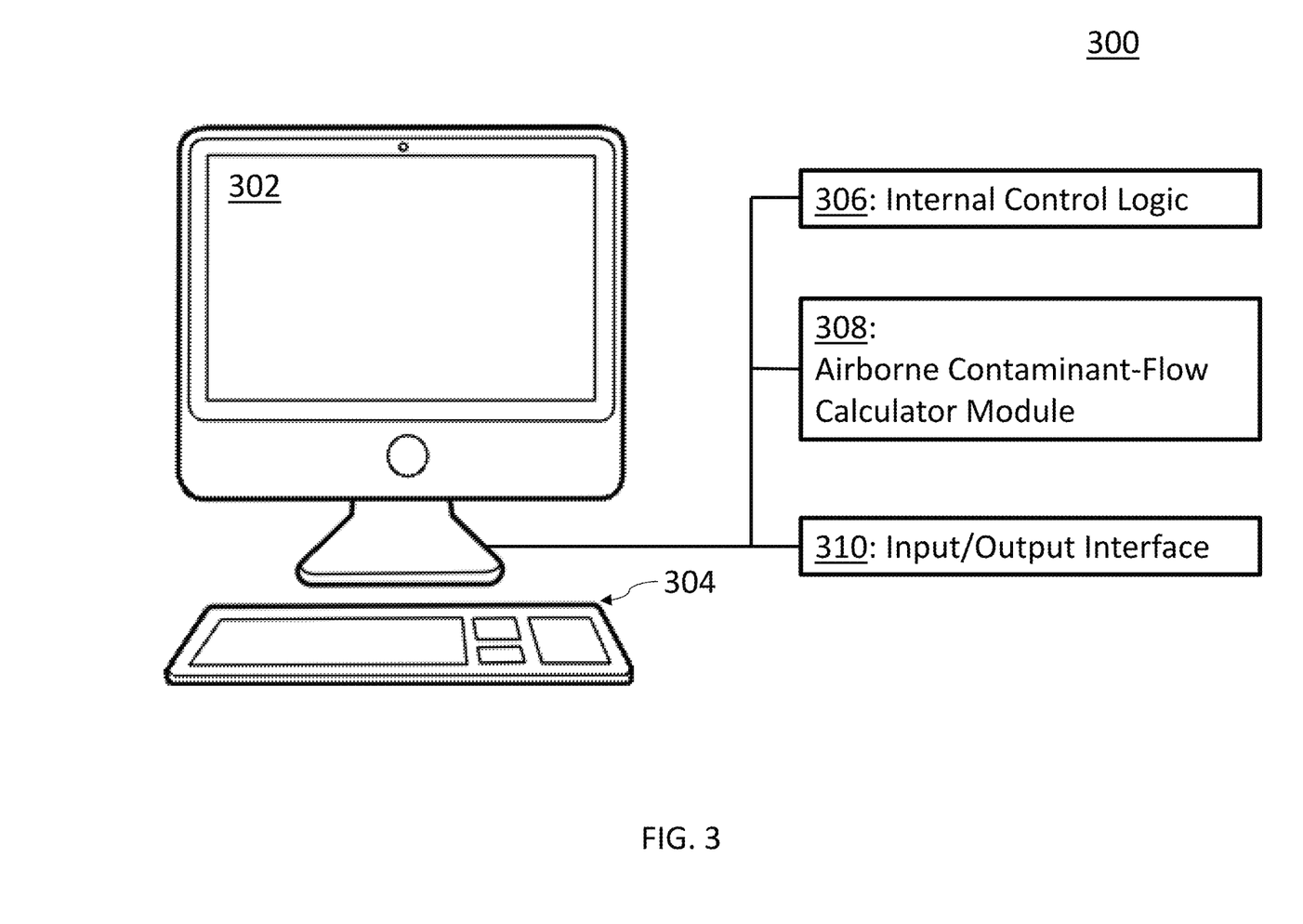
FIG. 3 is a generalized schematic of an HVAC controller.

According to aspects of the present disclosure, the HVAC system of the building 100 is an intelligent one, responding to contamination incidents by changing its configuration to protect the occupants of the building 100. For clarity's sake, aspects of the intelligent system are spread across three figures: FIG. 1 shows the HVAC elements built into the building 100; FIG. 2 presents a representative method performed by the intelligent system, and FIG. 3 shows a representation of the control logic that responds to contamination incidents by altering the configuration of the HVAC elements of FIG. 1. The present discussion focuses on all three of these figures at the same time in order to present aspects of the intelligent HVAC system.

Turning now to FIG. 2, the representative method 200 begins in step 202 when design information for the building 100 is entered into, and stored by, the HVAC controller 300 (FIG. 3). Of particular importance to the present discussion are any details that may influence the flow of air throughout the building 100. Clearly, such details include the purpose and size of the building 100, the capacity (as variously measured) of the building's HVAC systems, and the number and size of apertures (doors and windows) that may be opened to connect the building's inner environment with that of the outside. Other details may be important but less obvious such as the weather (temperature ranges and wind speeds) expected at the building's location and any special concerns about airborne contamination that the building's expected occupants may have.

If the building 100 is an older one, then the design information to be submitted to the HVAC controller 300 in step 202 may not be readily available, and this step 202 may necessitate extensive scanning and measuring of the existing building and even after-the-fact reconstruction of hidden elements or outdated construction techniques. Of importance to the current discussion, these reconstruction techniques may provide inaccurate data that adversely affect the quality of the airflow calculations performed in steps 206 and 210 (discussed below). The HVAC controller 300 should be aware of this possible source of inaccuracy and should be able to account for it, for example, by conservatively over-responding during a contamination incident (see discussion of step 208 below).

The possible contamination incident begins in step 204 when the HVAC controller 300 receives information via one or more of its input interfaces (310 in FIG. 3). Any number of different types of information may trigger the HVAC controller 300 to respond. For example, the information may come from a sensor in the building 100. Known examples include sensors responsive to unexpected levels of radiation, smoke, airborne particulates, chemicals, biological contaminants (e.g., pollen), temperature, fire, water, airflow, and motion (e.g., caused by an earthquake or explosion). Note that in the known art some sensors respond so slowly that they only provide information of long-term interest. While the information provided by such slowly acting sensors is valuable, the HVAC controller 300 responds better to sensors that provide information in near real time.

A further type of input information may also be important in triggering a response. A responsible person (e.g., the custodian of the building 100 or any concerned occupant) may note something troubling or merely unusual and may then provide information to the HVAC controller 300 in the form of an alert message. A well known example of this type of input is the ubiquitous fire alarm pull station (also known as a "call point") where a person pulls the triggering handle before the building's systems notice a problem.

For an extensive incident, the HVAC controller 300 in step 204 may receive multiple inputs providing complementary information at the beginning of the incident and as the incident develops.

In step 206, the HVAC controller's airborne contaminant-flow calculator module (308 of FIG. 3) applies the structural information gathered in step 202 along with the alert information received in step 204 to create a model showing how air is expected to flow (possibly carrying the contaminants) throughout the building 100.

As mentioned above, such airflow calculations were traditionally performed using extensive numerical modeling. Such modeling was both very expensive and very slow. An airflow model for a moderately-sized building would consume hours or even days of computer time. While the results are very useful and important, those methods were much too slow to provide near real-time feedback and to allow an HVAC controller to respond meaningfully to a developing contamination incident.

Now, however, recently developed closed-form solutions can be applied to many airborne contaminant scenarios. In many embodiments, the airborne contaminant-flow calculator 308 uses one or more closed-form solutions in step 206 and thus provides near real-time feedback to the intelligent HVAC controller 300. The result is often represented by a numerical "Protection Factor" that tells how well the building's occupants are protected from the airborne contaminant.

Note on the "Protection Factor:" This is one result of the contaminant-flow calculations, and it summarizes how good the structure under test will be at protecting its proposed occupants from airborne contaminants, whether those contaminants are intentionally introduced in an act of terrorism or unintentionally introduced (e.g., pollen or other allergens sucked into the building through the outdoor air filter at $T_{OA}$ or chemicals outgassed by a "sick building"). The exact interpretation of the Protection Factor depends upon the specifics of the methods used to calculate it other than the general observation that "higher numbers are better." For exemplary details usable in some embodiments, see the Notes on a Closed-Form Solution for Airborne Contaminant Flows below and, especially, the article "Bioprotection of Facilities" cited therein where the Protection Factor is defined as "the asymptotic ratio of outdoor-to-indoor air concentration of particulate matter when the outdoor air is held at a fixed contaminant concentration." The techniques disclosed herein are not tied to any particular method for calculating the airflow nor to any particular definition of the Protection Factor.

Based on the results of the calculations made in step 206, the intelligent HVAC controller 300 acts to protect the building's occupants in step 208. It does this by controlling one or more HVAC elements of the building 100. Such controllable elements may include, for example, a valve, shutter, a window, door, hatch, fan, and a filtration unit. If the HVAC controller believes that an airborne contaminant has already infiltrated the building 100, then it may alter airflows to dilute the concentration of the contaminant or to divert the contaminated air away from the building's occupants. In most cases, the appropriate response action depends upon the nature of the incident as reported in step 204.

To see one example, turn back to the simplistic building 100 of FIG. 1. Under normal circumstances, the air flows around the primary loop 102, and the emergency loop 104 is not used. (It may be closed off by a movable shutter in the air ducts leading to the emergency air filter at $T_E$, for example.) If the contaminant is thought to be purely internal to the building 100, then the HVAC controller 300 may dilute its concentration by controlling a fan that in turn increases the amount of air coming in from the outside $(1-\eta)$.

In another example, the HVAC controller 300 decides that the filtering performances of the filters at $T_{OA}$ and $T_{IA}$, in the primary loop 102 are not adequate to safely handle the developing contamination incident. It then brings the emergency loop 104 into operation by opening a shutter and turning on a fan, thus diverting some of the internal air to the emergency air filter at $T_E$. If, as is not uncommon, the normal filters at $T_{OA}$ and $T_{IA}$ are rated at Minimum Efficiency Reporting Value ("MERV") 8, then the emergency filter at $T_E$ may be rated at MERV-15 or may even be a High-Efficiency Particulate Air ("HEPA") filter. The emergency air filter at $T_E$ reduces the contaminant concentration in the building's air below the concentration achievable by the normal filters alone.

(Note that FIG. 1 is simplified for clarity's sake. In an actual installation, the normal and emergency filters would probably be at the same location within the ductwork of the building 100, although the diversion of air to the emergency filter could work as described above.)

Figure 4A:
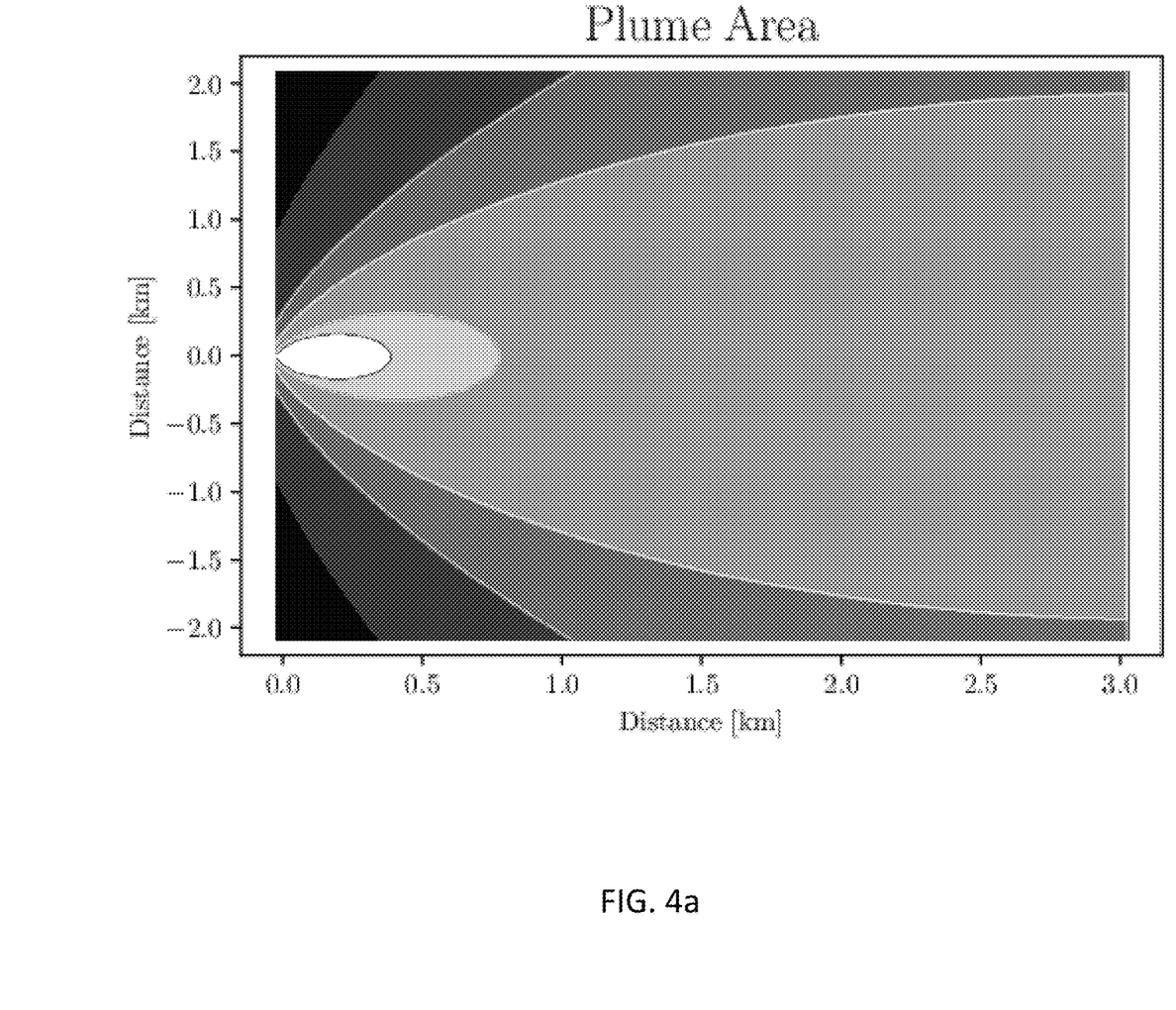
FIGS. 4*a*, 4*b*, and 4*c* show the results of an intelligent HVAC system bringing online better (and more expensive) air filtration units in response to an airborne contamination incident.
Figure 4B:
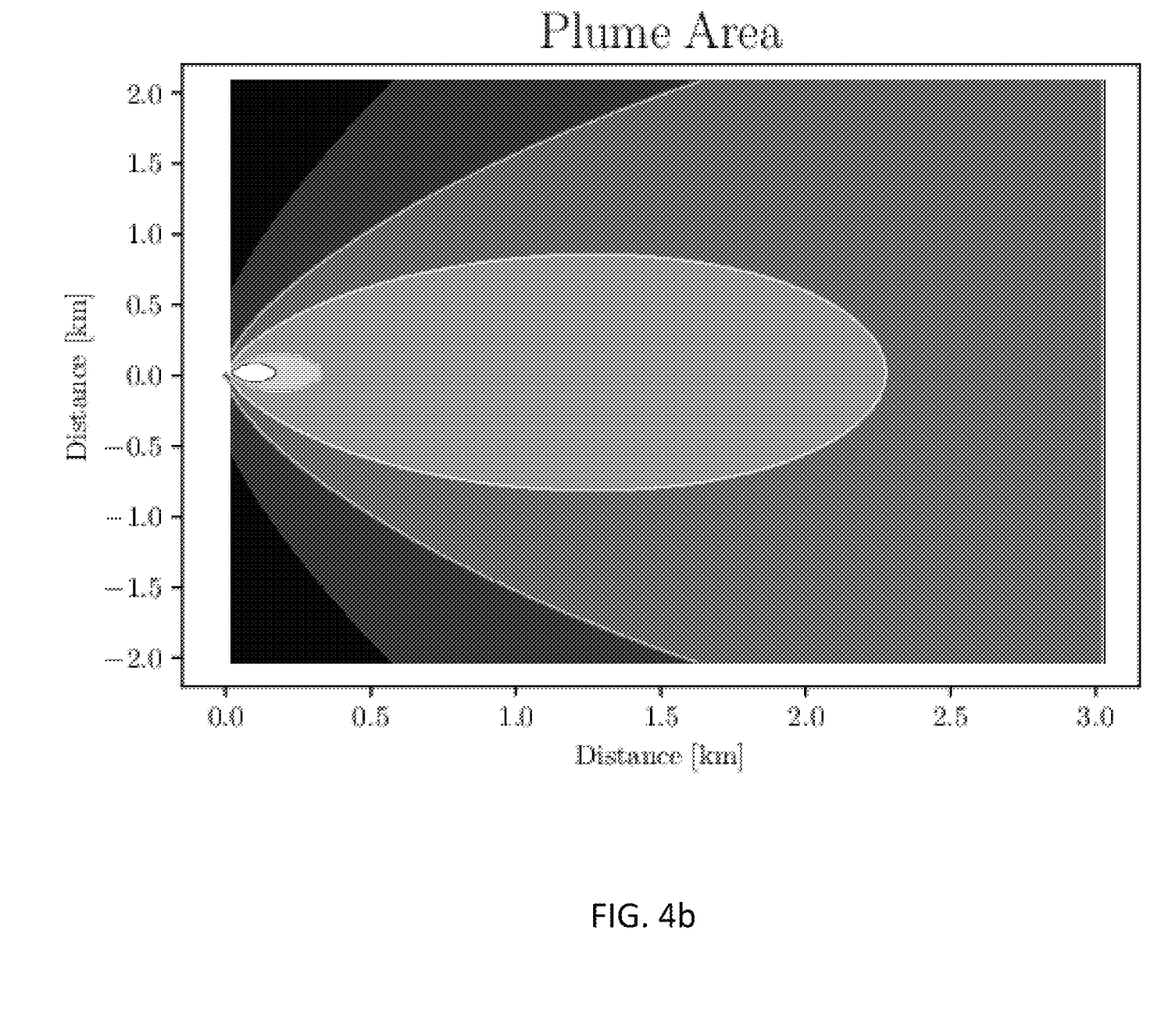
Figure 4C:
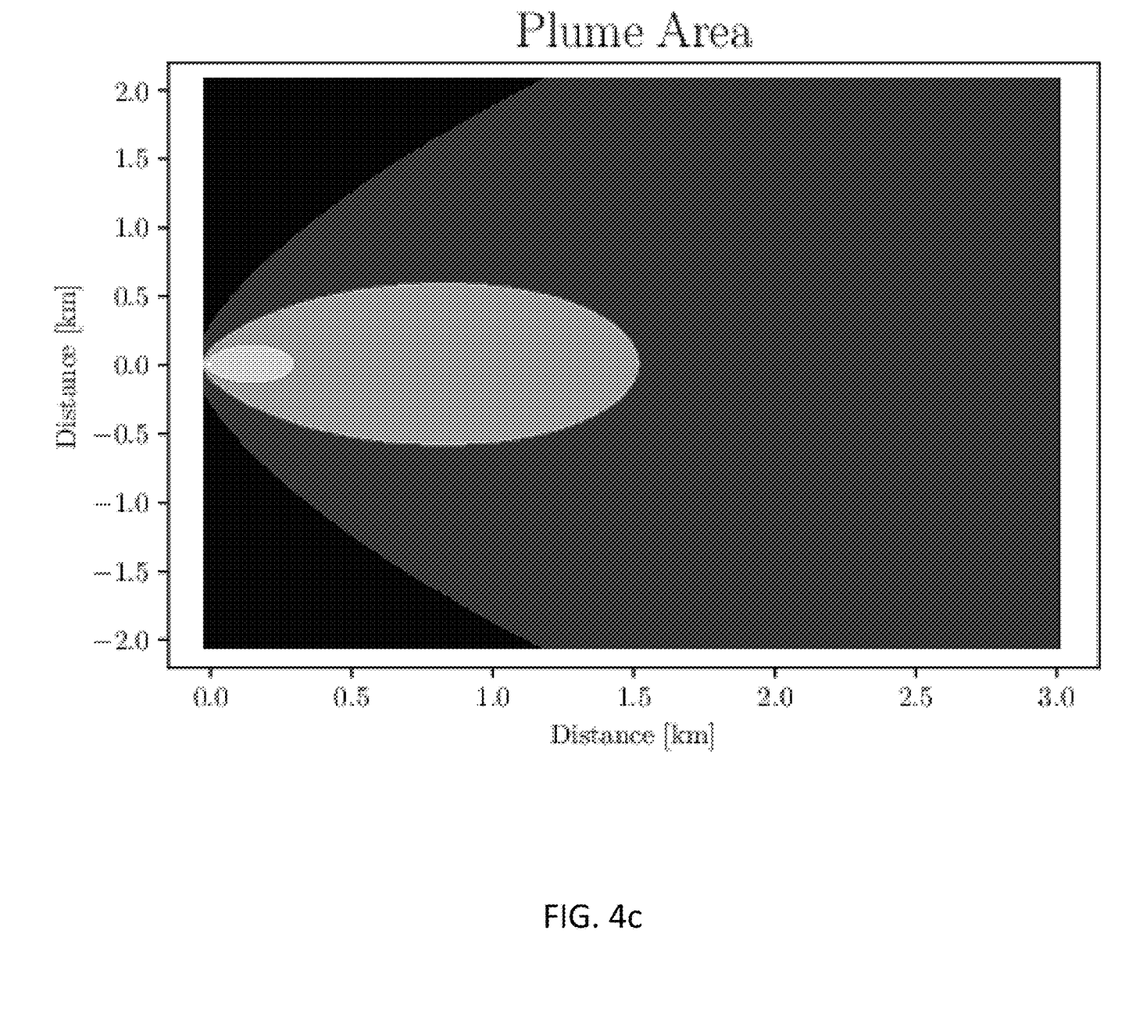

To illustrate the dramatic effects of better air filtration, consider FIGS. 4a, 4b, and 4c. Simulations were run of the distribution of a plume of contaminated air in the presence of different levels of filtration. The simulation of FIG. 4a assumes MERV-8 filters and serves as a baseline for the other two figures. In FIG. 4b, the MERV-8 filters are replaced with MERV-15 filters. This change reduces the area affected by the plume by 80%. Even more striking, FIG. 4c assumes HEPA filters which reduce the affected area by 99.94% when compared against the baseline MERV-8's of FIG. 4a.

(Given these results, it may well be wondered why the "emergency" air filter at $T_E$ is not simply made a permanent element of the primary loop 102 to run all the time rather than waiting to be called into service by the HVAC controller 300? The answer is simple: cost. Running MIL-SPEC HEPA filters can cost hundreds of thousands of dollars per year per installation in added electricity and replacement filter costs over running MERV-8 filters, which are perfectly adequate for most non-emergency situations.)

The HVAC controller 300 can also respond to the developing incident by sending an alert message. Well known alerts can include vital information such as audible or visual warnings or a text message with safety instructions sent to registered cellphones. In some embodiments, the HVAC controller 300 may not be able to directly control an important HVAC element but may instead send instructions to building personnel to effect the change. Because of the airflow calculations performed in step 206, in conjunction with the information reported in step 204, the HVAC controller 300 can determine where the contaminant is probably going and where it is probably not going. This intelligence is then used to tailor the alerts to move the occupants of the building 100 to safe zones as directly as possible.

Optional steps 210, 212, and 214 come into play if updated information becomes available to the HVAC controller 300 while the contamination incident continues to develop. By repeatedly updating the airflow calculations based on the most up-to-date information, the HVAC 300 controller can better direct occupants to safe areas and responders to where they can have the most beneficial effect.

Turning now to FIG. 3, not much more needs be said. Driving the HVAC controller 300 is an internal control module 306, typically one or more microprocessors working together. The internal control module 306 controls the input/output interfaces 310 and stores the structural design information in short-term and long-term memories (not shown but well known in the art). The internal control logic 306 also invokes the airborne contaminant-flow calculator 308 when appropriate.

While for clarity's sake the HVAC controller 300 is illustrated in FIG. 3 as a typical PC, it is more likely to be an industrial PC hardened against environmental and other abuses. Instead of a dedicated screen 302 and keyboard 304, it may have an internet or other network interface that incorporates the input/output interfaces 310. In some embodiments, the HVAC controller 300 is a network server located remotely from the building 100 and possibly monitoring and controlling the HVAC systems at a number of installations.

By bringing airflow calculations into the heart of the HVAC control process, the above procedures make a great advance over traditional techniques that treat airflow calculations as a one-time process that could not be re-visited during a contamination incident. By repeatedly recalculating the airflows, the HVAC controller 300 keeps up with the developing incident to better protect the building's occupants.

Notes on a Closed-Form Solution for Airborne Contaminant Flows

As mentioned above, airborne contaminant-flow problems are often stated in terms of systems of ordinary differential equations which can be addressed by matrix-inversion methods.

Traditionally, many problems requiring matrix inversion are addressed using either computer algebra systems or numerical approximations and simulations. Numerical solutions usually require that all algebraic variables be substituted with specific numbers, so that an individual program run yields a single specific numerical result. Understanding how this numerical answer varies with a change in system variables requires many program runs. Moreover, numerical methods use floating-point numbers which are subject to errors when a computer attempts to handle both very large and very small numbers simultaneously.

Computer algebra systems, although avoiding the vagaries associated with floating-point representation, are exceptionally complex as they need to handle a large variety of functions: linear, trigonometric, transcendental, etc. They also require a large rule-base of algebraic manipulations.

Fortunately, recent advances in the field have begun to yield closed-form solutions for many airborne contaminant scenarios. This note details a few such solutions. For another, complementary, analysis, see the article by M. D. Ginsberg & A. T. Bui entitled "Bioprotection of Facilities," Defense & Security Analysis (2015), which is incorporated herein in its entirety by reference.

Consider the general formulation of an ordinary differential equation used to describe a dynamical system. In the time domain, this problem description is to study the time evolution of a signal y(t) as a function of the time-varying signal u(t). As a convention, the bold typeface means vector or matrix (depending on context). In the time domain, let x be a column vector of time-varying signals $x(t)=[x_1(t), x_2(t), \ldots, x_n(t)]^T$. Let y(t) and u(t) be the time-varying scalar output and input (respectively) of the system. Let F be a square, constant, state-matrix of n×n.

A canonical example is given here in frequency space:

$$sX(s)=FX(s)+GU(s)$$

$$Y(s)=HX(s) \quad (1)$$

where X(s) is Laplace transform of x(t) as given earlier. Analogously, U(s) is an exogenous input, and Y(s) is an output of interest. F is a state-matrix; G and H are vectors. For simplicity, F, G, and H contain constants. One can easily ask for the "transfer function" of the system (how the input maps to the output). Using the notation/as the identity matrix, the formal solution is:

$$\frac{Y(s)}{U(s)} = H(sI-F)^{-1}G \quad (2)$$

Notice this requires calculating the matrix inverse $(sI-F)^{-1}$. As the number of states n increases, this matrix grows as $n^2$. This can easily exhaust computational resources if carried out with numerical methods or with standard computer algebra methods (e.g., by using Cramer's rule or similar).

To continue fleshing out this idea, consider this equation worked out for a two-state system:

$$\begin{bmatrix} \dot{x}_1(t) \\ \dot{x}_2(t) \end{bmatrix} = \begin{bmatrix} a & b \\ c & d \end{bmatrix}\begin{bmatrix} x_1(t) \\ x_2(t) \end{bmatrix} + \begin{bmatrix} e \\ f \end{bmatrix}u(t) \quad (3)$$

$$y(t) = [g \ h]\begin{bmatrix} x_1(t) \\ x_2(t) \end{bmatrix}$$

Figure 5:
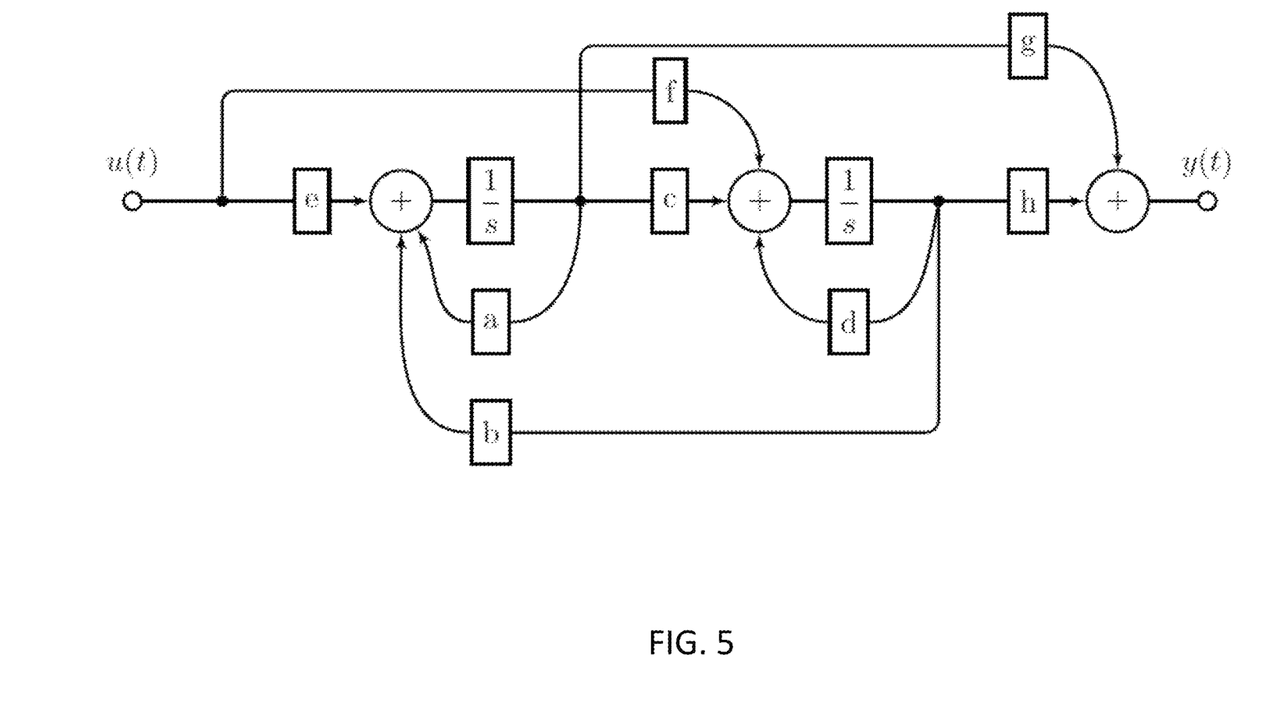
FIG. 5 is an all integrator block diagram.

Note that this is equivalent to the "all integrator block diagram" shown in FIG. 5.

To solve Equation (3) by hand, use Equation (2):

$$(sI-F)^{-1} = H(sI-F)^{-1}GU(s) \quad (4)$$

$$= [g \ h]\begin{bmatrix} s-a & -b \\ -c & s-d \end{bmatrix}^{-1}\begin{bmatrix} e \\ f \end{bmatrix} \quad (5)$$

$$= \left(\frac{egs - deg + bfg + ceh + fhs - afh}{(s-a)(s-d) - bc}\right) \quad (6)$$

$$= \left(\frac{egs - deg + bfg + ceh + fhs - afh}{s^2 - s(a+d) + ad - bc}\right) \quad (7)$$

Using software, a simple gain evaluation by inspection produces:

$$\frac{Y(s)}{U(s)} = \frac{egs - deg + fhs - ahf + ceh + bfg}{s^2 - as - ds - bc + ad} \quad (8)$$

Carefully comparing Equations (7) and (8) shows that this is the required result.

At first blush, the preceding calculations merely yielded the transfer function:

$$\frac{Y(s)}{U(s)}$$

What happened to the promised inverse matrix $(sI-F)^{-1}$? A key realization here is that the vectors G and H play no role in the inverse. Hence they could be assigned any value which might be helpful. For instance, the choice: $G=[e,f]^T=[1,0]$ and $H=[g,h]=[1,0]$ picks off the first row and first column of $(sI-F)^{-1}$. Carrying this idea further, G and H can be set to values that pick off the desired row and column of $(sI-F)^{-1}$, respectively. Therefore the transfer function given by Equation (8) contains complete information about the inverse matrix $(sI-F)^{-1}$. For clarity's sake, now carry this out both by hand calculation starting with F and then compare the result to substituting selected variables (namely e, f, g, and h) into the transfer function of Equation (8). Hence:

$$(sI-F)^{-1} = \begin{bmatrix} s-a & -b \\ -c & s-d \end{bmatrix}^{-1} \quad (9)$$

$$= \left(\frac{1}{(s-a)(s-d) - bc}\right)\begin{bmatrix} s-d & b \\ c & s-a \end{bmatrix} \quad (10)$$

$$= \begin{bmatrix} \left(\frac{s-d}{s^2 - as - ds + ad - bc}\right) & \left(\frac{b}{s^2 - as - ds + ad - bc}\right) \\ \left(\frac{c}{s^2 - as - ds + ad - bc}\right) & \left(\frac{s-a}{s^2 - as - ds + ad - bc}\right) \end{bmatrix} \quad (11)$$

So, for example, substituting e=1, f=0, g=1, h=0 into Equation (8) yields the row 1, column 1 term in Equation (11) as stated earlier. The following equations can be seen by careful inspection of Equations (8) and (11) because the denominators are equal to one another and invariant with respect to the variables e, f, g, and h. Hence:

$$\left.\frac{Y(s)}{U(s)}\right|_{\substack{e=1,f=0 \\ g=1,h=0}} = \frac{s-d}{s^2 - as - ds + ad - bc} \quad (12)$$

$$\left.\frac{Y(s)}{U(s)}\right|_{\substack{e=0,f=1\\g=1,k=0}} = \frac{b}{s^2 - as - ds + ad - bc} \quad (13)$$

$$\left.\frac{Y(s)}{U(s)}\right|_{\substack{e=1,f=0\\g=0,k=1}} = \frac{c}{s^2 - as - ds + ad - bc} \quad (14)$$

$$\left.\frac{Y(s)}{U(s)}\right|_{\substack{e=0,f=1\\g=0,k=1}} = \frac{s-a}{s^2 - as - ds + ad - bc} \quad (15)$$

again proving the equivalence of information stored in Equation (8) by careful selection of the extra vectors G and H.

There are strategic ways in which the system can be made more complicated, yet yield enough additional information that the additional complexity is worth accepting.

As shown above, the free variables of the vectors G and H allowed the method to read the inverse matrix element-by-element after calculating a single transfer function. This process can be understood by imagining the vectors G and H as being like oscilloscope probes making contact with the system at two points, one being interpreted as an input node and the other as an output node. Thus, substitute the value "1" both where a probe touches the input node (in the vector G) and where a probe touches the output node (in the vector H). All other components of G and H are set to zero.

Although these extra variables make the system more complicated, and can quickly push the calculations beyond the capability of a human, they are easily handled by a computer and yield the complete inverse matrix.

A formal proof of this property would require an extra signal input, call it $i_m(t)$ for "meta" input, and a meta output $o_m(t)$. There would be two extra vectors, $G_m$ and $H_m$ each of which has connections to each node of the circuit, where node is defined as: input signal, output signal, summing output, integrator input, and integrator output. Any of these nodes may be redundant if connected to another node with no intervening transmittance or sum. In the example, this is six nodes: input, output, and either side of each integrator.

Some matrices do not have an inverse; they are said to be singular. Further, some matrices may represent a system diagram with unusual characteristics. As an example, the resulting diagram may represent two or more non-connected system diagrams. In general, any of these situations could cause the "gain evaluation by inspection" method to produce nonsense answers. However, the complexity of the matrix may be increased by adding new "conditioning" variables and connections that condition the matrix to have desirable properties. Elements of the resulting inverse matrix can be taken when these variables are driven to a specific limit that removes their effect from the final solution. As an example, one could add connections at a transmittance of t that assure a path from the input to the output. The inverse matrix can then be subject to taking a limit as t goes to zero, thus erasing the new connection from the problem altogether.

By strategic use of conditioning variables, connections are added to the system diagram in a manner that may increase the complexity of the system diagram beyond any hope of human analysis. However, any pathology exhibited by the original matrix does not appear until limits are taken of the individual terms of the resulting inverse matrix. This is an intrinsically much simpler method to manage than existing numerical approximations to taking a matrix inverse.

A typical numerical approximation to taking an inverse can lead to the computer having to handle numerical quantities, some of which may be huge where others are tiny, or can lead to other pathological conditions that do not translate well to a computer's method of interpreting real numbers. The method described above, by keeping all results strictly algebraic, neatly skips over any of these problems until the end of the calculation. Once that point is reached, all of the resulting matrix entries are far easier to handle as individual expressions.

In some situations, better performance may be achieved by swapping Mason's Gain Formula for another standard method. Two likely candidates are the Samuelson-Berkowitz Method (a.k.a. "Berkowitz's algorithm") and the Bereiss' Method.

The motivation to use these two methods is straightforward. Brute-force methods of matrix inversion (the most ubiquitous of which is Cramer's Rule) have a huge drawback. Although they arrive at the correct algebraic expression, the numerator and denominator generated can have a large number of canceling terms. This defeats the purpose of being free from an underlying computer algebra system. Indeed finding such cancelling terms adds needless computing time.

The need to invert a matrix and then avoid cancelling dividing terms has been looked at previously under another guise: when the matrix elements yield "characteristic polynomials over any commutative ring." Luckily, the algorithms by Bereiss and Berkowitz are considered computationally efficient, and further, they are easily implemented for parallel computers. Hence, some implementations may use one or the other of these methods when inventing the (sI−F) matrix.

Unless explicitly stated otherwise, each numerical value and range should be interpreted as being approximate as if the word "about" or "approximately" preceded the value or range.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the testing measurements.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entireties or alternatively to provide the disclosure for which they were specifically relied upon.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

I claim:

1. An intelligent heating, ventilation, and air conditioning ("HVAC") system comprising:
    an input device;
    control logic configured to read information from the input device, to calculate an airborne contaminant flow, the calculating based, at least in part, on the information read from the input device, and to respond to the calculated airborne contaminant flow by controlling an HVAC element; and
    the controllable HVAC element;
    wherein the control logic is configured to apply a closed-form solution for calculating the airborne contaminant flow;
    wherein the controllable HVAC element is selected from the group consisting of: a valve, a shutter, a window, a door, a hatch, a fan, a filtration unit, and an alert interface;
    wherein the controllable HVAC element is an alert interface and wherein the control logic is configured to cause the alert interface to display alert information selected from the group consisting of: an audible alert, a visible alert, a text alert, safety instructions, and a suggestion for manipulating an HVAC element.

2. The intelligent HVAC system of claim 1 wherein the HVAC system is configured for use in a structure selected from the group consisting of: a building, a ship, a space station, a spacecraft, and an airplane.

3. The intelligent HVAC system of claim 2 further comprising:
    a memory store configured for storing a design of the structure;
    wherein the calculating of the airborne contaminant flow is based, at least in part, on the stored design of the structure.

4. The intelligent HVAC system of claim 1 wherein the input device is selected from the group consisting of a radiation sensor, a smoke sensor, a particulate sensor, a chemical sensor, a biological sensor, a temperature sensor, a fire sensor, a water sensor, an airflow sensor, a motion sensor, and a user-interface input.

5. A method for controlling a heating, ventilation, and air conditioning ("HVAC") system, the method comprising:
    reading information via an input device;
    calculating an airborne contaminant flow, the calculating based, at least in part, on the information read via the input device; and
    responding to the calculated airborne contaminant flow by controlling an HVAC element;
    wherein the calculating comprises applying a closed-form solution for the contaminant flow;
    wherein the controllable HVAC element is selected from the group consisting of: a valve, a shutter, a window, a door, a hatch, a fan, a filtration unit, and an alert interface;
    wherein the controllable HVAC element is an alert interface and wherein controlling the alert interface comprises causing the alert interface to display alert information selected from the group consisting of: an audible alert, a visible alert, a text alert, safety instructions, and a suggestion for manipulating an HVAC element.

6. The method for controlling an HVAC system of claim 5 wherein the HVAC system is in a structure selected from the group consisting of: a building, a ship, a space station, a spacecraft, and an airplane.

7. The method for controlling an HVAC system of claim 6 further comprising:
    reading a stored design of the structure;
    wherein the calculating of the airborne contaminant flow is based, at least in part, on the stored design of the structure.

8. The method for controlling an HVAC system of claim 5 wherein information read via the input device is selected from the group consisting of: radiation information, smoke information, particulate information, chemical information, biological information, temperature information, fire information, water information, airflow information, motion information, and user-interface input information.

9. An intelligent heating, ventilation, and air conditioning ("HVAC") control server comprising:
    an input interface;
    control logic configured to read information via the input interface, to calculate an airborne contaminant flow, the calculating based, at least in part, on the information read via the input interface, and to respond to the calculated airborne contaminant flow by sending information via an output interface to control an HVAC element; and the output interface;

wherein the control logic is configured to apply a closed-form solution for calculating the airborne contaminant flow;

wherein the information sent via the output interface is selected from the group consisting of: an instruction to sound an audible alert, an instruction to display a visible alert, a text alert, safety instructions, and a suggestion for manipulating an HVAC element;

wherein the HVAC element is selected from the group consisting of: a valve, a shutter, a window, a door, a hatch, a fan, a filtration unit, and an alert interface.

10. The intelligent HVAC control server of claim 9 configured to control an HVAC system in a structure selected from the group consisting of a building, a ship, a space station, a spacecraft, and an airplane.

11. The intelligent HVAC control server of claim 10 configured to control a plurality of HVAC systems.

12. The intelligent HVAC control server of claim 11 further comprising:
a memory store configured for storing, for each of the plurality of HVAC systems, a design of the structure;
wherein, for each of the plurality of HVAC systems, the calculating of the airborne contaminant flow is based, at least in part, on the stored design of the structure.

13. The intelligent HVAC control server of claim 9 further comprising an internet interface that comprises the input interface and the output interface.

14. The intelligent HVAC control server of claim 9 wherein information read via the input interface is selected from the group consisting of: radiation information, smoke information, particulate information, chemical information, biological information, temperature information, fire information, water information, airflow information, motion information, and user-interface input information.

* * * * *